United States Patent [19]

Welch et al.

[11] 3,993,193

[45] Nov. 23, 1976

[54] DOCUMENT SORTING SYSTEM

[75] Inventors: Rolland Welch, Fairfax; Robert Springer, Woodbridge; Brian Mayberry, Alexandria, all of Va.; Robert Sheppard, Poolesville, Md.

[73] Assignee: Optical Recognition Systems, Inc., Reston, Va.

[22] Filed: Jan. 16, 1975

[21] Appl. No.: 541,681

Related U.S. Application Data

[62] Division of Ser. No. 355,633, April 30, 1973, Pat. No. 3,874,653.

[52] U.S. Cl. .................. 209/74 M; 235/61.7 R; 250/555
[51] Int. Cl.² .................................. B07C 5/00
[58] Field of Search ........... 209/73, 74 R, 74 M, 209/111.7; 250/555, 556, 567, 568, 569; 235/61.11 A, 61.11 F, 61.7 R; 271/64

[56] References Cited
UNITED STATES PATENTS

| | | | |
|---|---|---|---|
| 3,343,672 | 9/1967 | Vries et al. | 209/74 R |
| 3,352,417 | 11/1967 | Cutaia | 209/74 R |
| 3,460,673 | 8/1969 | Sanner | 209/74 R X |
| 3,791,517 | 2/1974 | Friedman | 209/74 R |

Primary Examiner—Robert B. Reeves
Assistant Examiner—Joseph J. Rolla
Attorney, Agent, or Firm—Beveridge, DeGrandi, Kline & Lunsford

[57] ABSTRACT

A document sorting system employing a plurality of elongated flexible strips which form document transport channels therebetween and which terminate at a plurality of sorting areas. A magnetic apparatus is provided for selectively deflecting the ends of the flexible strips to form an appropriate channel entrance for the document to be sorted. A coil member is attached to the said end of each flexible strip and current is sent through the coil of the coil members. The coil members are disposed for movement on a piece of the magnetic apparatus and current through the coils of the coil members cooperate with the magnetic field produced by the magnetic apparatus to selectively deflect the coil members and the ends of the flexible strips. The coils of the coil members are connected in a circuit which determines the direction of the current flow in each of the coils. An electronic system is provided for selectively activating activatable document receiving means which are located at the end of each channel and for indicating when missort errors have occurred.

4 Claims, 11 Drawing Figures

DOCUMENT SORTING SYSTEM

This is a division of application Ser. No. 355,633, filed Apr. 30, 1973, now U.S. Pat. No. 3,874,653.

The invention relates to an improved document sorting system.

In recent years, systems for sorting documents into selected areas in accordance with information sensed from the documents have gained widespread use. For example, one field in which such systems have been used is in the sorting operation connected with bank checks wherein a character or characters read from the check by a character recognition means is determinative of which one of several sorting areas the check is to be sorted into. The present invention, however, is not limited to check sorting system, but is applicable to document sorting systems generally.

One problem associated with document sorting systems generally is that of documents jamming in the transport path. To minimize the risk of jamming, the system of the present invention provides a plurality of elongated flexible strips along the document transport path forming a plurality of document transport channels therebetween. Documents destined for different sorting areas are transported in different channels and the risk of jamming is therefore minimized. To effectively handle multilated documents, a stacker which pulls the document around to a designated region may be located at each sorting area.

In accordance with the invention, novel magnetic apparatus for moving the flexible strips so as to admit the documents to the proper transport channels is provided. A coil member of unique construction is attached to each flexible strip and current which is sent through the coils of the coil members interacts with the magnetic field produced by the magnetic apparatus to move the coil members and the flexible strips. The construction of the magnetic apparatus results in a relatively closed magnetic circuit which is effective to concentrate the magnetic lines of force and to apply a maximum amount of deflective force to the coil members.

A further problem generally associated with sorting systems is that of missorting documents or sorting documents into incorrect sorting areas. According to the invention, a novel electronic system is provided for reducing the possibility of missorts and for detecting the occurrrence of missorted documents shortly after the errors occur. The electronic system is relatively time independent in that the passage of the leading edge of the document is operative to transfer the information read from the document along the transport path correspondence with the travel of the document itself. The electronic system employs a means associated with each stacker for indicating when a document not destined for that stacker has been missorted in the stacker and when a document which was destined for the preceding stacker has passed the preceding stacker without being sorted therein.

It is therefore an object of the invention to provide a document sorting system employing a plurality of channels formed by elongated flexible strips.

It is a further object of the invention to provide an improved magnetic apparatus for deflecting the flexible strips.

It is still a further object of the invention to provide a coil member of improved construction for cooperating with said magnetic apparatus.

It is still a further object of the invention to provide an improved circuit utilized relatively few components for providing current to the coils of said coil members.

It is still a further object of the invention to provide an improved electronic system for selectively activating the stackers or other activatable document receiving means which may be used.

It is still a further object of the invention to provide an improved electronic system for indicating that sorting errors have occurred.

A better understanding of the invention will be had by referring to the drawings which illustrate a preferred embodiment of the invention in which.

Figure 1:
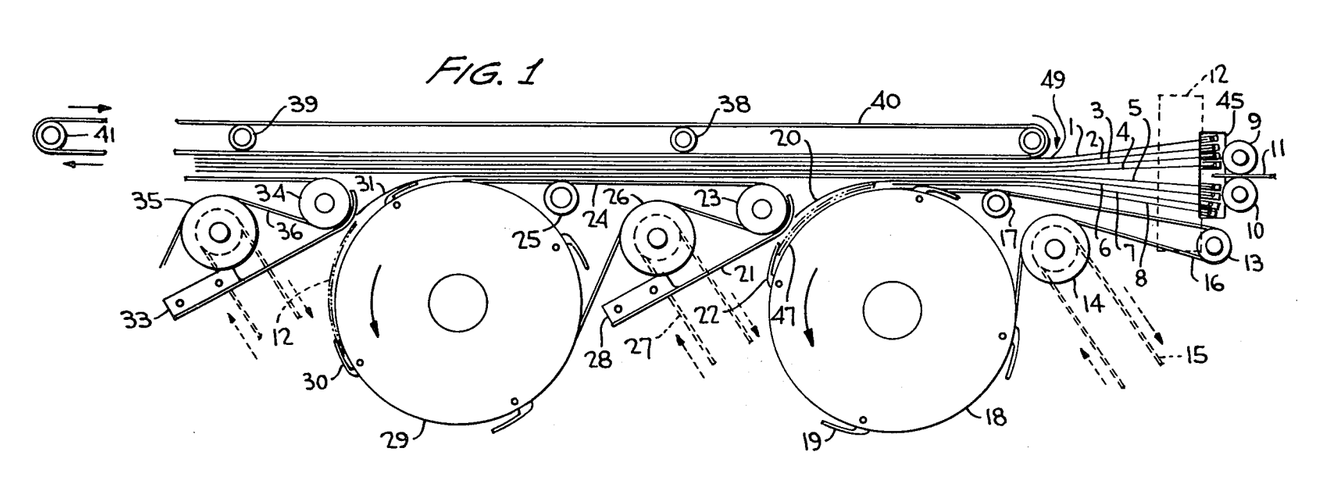
FIGS. 1 and 2 show a top and side view respectively of an overview of part of the system of the invention.

Referring to FIG. 1, it is desired to sort document 11 shown entering the apparatus between rollers 9 and 10 into one of a plurality of stackers which may be utilized in the system, two of which are shown at 18 and 29, on the basis of information read from the document. Elongated strips 1 to 8 are provided forming seven document transport channels therebetween, each transport channel terminating at a different stacker. The provision of separate transport channels leading to the different stackers minimizes the risks of jams occurring. The stackers, which are disclosed in detail in copending U.S. patent application Ser. No. 256,853 assigned to the assignee of the present application grip the documents and pull them around instead of pushing them and are able to effectively handle multiated as well as perfect documents.

In order to sort the document into the correct stacker, it is necessary to, (1) route the document into the correct transport channel at channel selection station 45 and, (2) arrange for a finger of the stacker, such as finger 22 of stacker 18 to be closed in the document when it arrives at the stacker. It should be noted that while seven transport channels are shown in FIG. 1, only two of the stackers are shown for convenience of illustration. However, it is to be understood that the present invention may be utilized with any number of channels and stackers.

Elongates strips 1 to 8 are constructed of a rigid but flexible material such as beryllium-copper. The ends of strips 2 to 7 at document selection station 45 are arranged so that they may flex to open up an appropriate channel for the document 11, which is determined by information read from the document by a recognition means located upstream of rollers 9 and 10. Thus, in FIG. 1 it is seen that strips 1 to 4 are deflected to one side, while strips 5 to 8 are deflected to the other side of document selection station 45 thereby opening up a transport channel between strips 4 and 5. In accordance with information which is read on the document, the circuitry shown in FIG. 8 and to be described in detail hereinafter is operative to deflect the strips to one side or another thereby selecting the channel which leads to the stacker corresponding to the information read. The right hand ends of strips 1 and 8 are arranged not to flex by securing the ends of the strips or a point near the ends of the strips to a stationary part of the apparatus such as a post attached to feed plate 42. The part of the strips 1 to 8 to the left of numeral 49 in FIG. 1 do not flex and therefore form a bundle of relatively straight strips and channels for the transport of documents. In an actual embodiment of the system, each strips was approximately 0.006 inch wide and the strips are positioned practially touching each other so that the bundle of eight strips is still relatively narrow. In the operation of the system as a document travels along a channel the strips may randomly contact each other.

Figure 2:
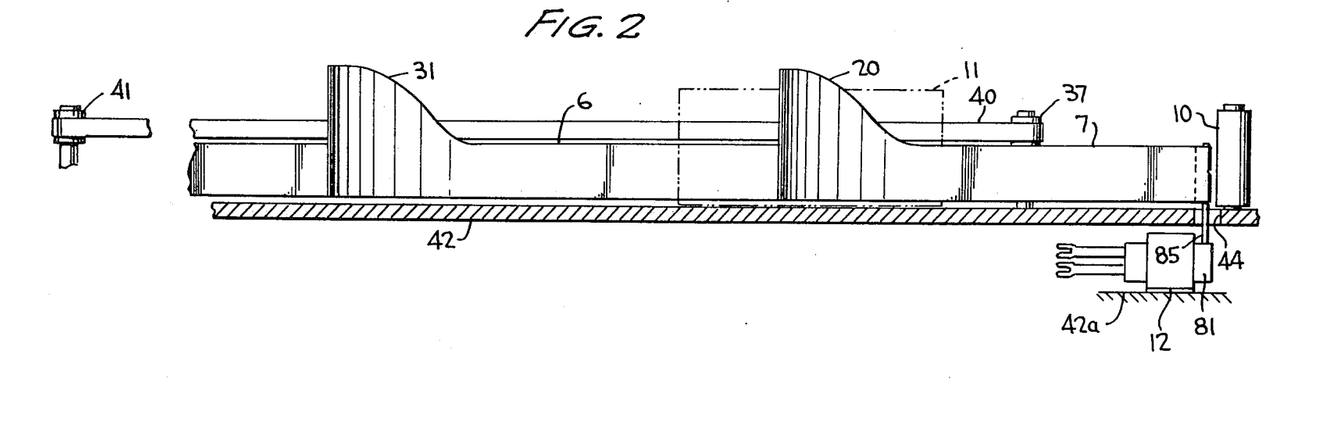

Referring to FIG. 2, the document, which for purposes of example may be a bank check 11, is fed along feed plate 42 located beneath the elongated strips. Also, as shown in FIG. 2, the strips are arranged over most of their length to be of a height which permits significant portion of the document to extend above them. Referring to FIG. 1, rear feed belt 40 and front feed belts 16, 24 and 36 grip the document therebetween and transport it from right to left in FIGS. 1 and 2. While for purposes of illustration the front and rear feed belts appear to be somewhat separated from each other in an actual machine in order to transport the documents therebetween they would be almost touching each other. While the preferred embodiment of the invention is described in conjunction with the use of feed belts it is to be understood that any other known form of transport means, such as for instance rollers may be used in the system of the invention. In FIG. 1, rear feed belt 40 is shown extending around drive rollers 32 and 41 and idle rollers 38 and 39. There is a separate front feed belt for each stacker. Front feed belt 16 extends around drive capstan 14 which is driven by a conventional drive means, such as drive belt 15 in the direction of the arrows. Belt 16 also extends around rollers 13 and 17 and around the periphery of stacker 18. The outside surface of stacker 18 may be provided with a groove to suitably accomodate the drive belt. Front drive belt 24 in a similar fashion extends around drive capstan 26, rollers 23 and 25, and stacker 29, and front drive belt 36 is shown in part extending around capstan 35 and roller 34.

Strips 7 and 8 terminate at stacker 18. The left end 20 of strip 7 as shown in FIGS. 1 and 2 curves in the direction of the stacker and is also raised. The end of strip end 20 is attached such as by welding to fender 21 associated with stacker 18. Fender 21 may be attached to feed plate 42 or to a member attached to feed plater 42 by bracket 28. Hnce, a document traveling in the channel formed by strips 7 and 8 shown as 47 in FIG. 1 will be guided into the stacker by end 20. The end 20 is raised to overcome the tendency of the document to continue traveling in the straight line path. Similarly, the left end 31 of strip 6 bends toward stacker 29, is raised as shown in FIG. 2 and is attached to fender 32 associated with stacker 29.

Figures 3, 3A, 4, 5:
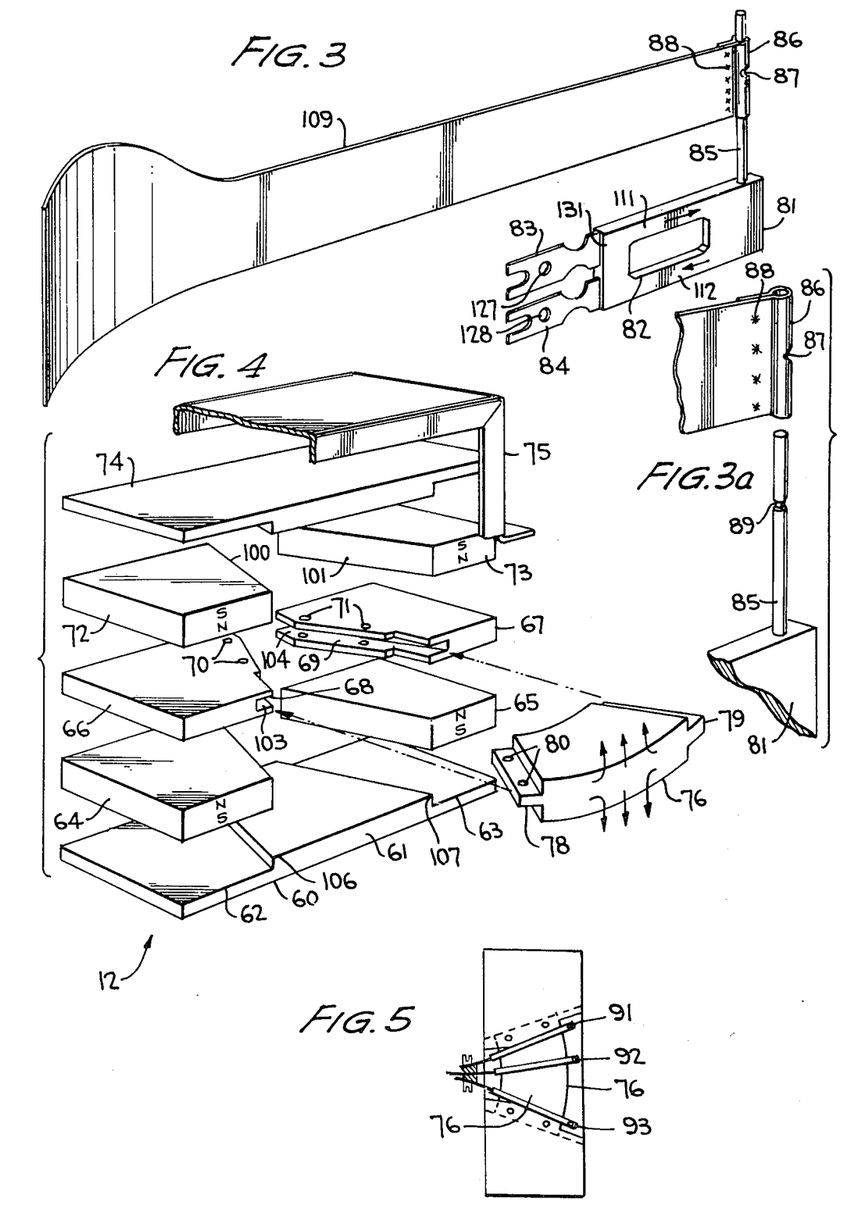
FIG. 3 shows a coil member/strip sub-assembly of the system of FIGS. 1 and 2.
FIG. 3a is a detailed view of a portion of FIG. 3.
FIG. 4 if an exploded perspective view of the magnetic apparatus of the invention.
FIG. 5 is a top view of the magnetic apparatus of the invention.

The magnetic apparatus 12, which determines the channel into which the document is guided, is shown in greater detail in FIGS. 3, 4 and 5. As shown in FIG. 3, each of the strips 2 to 7 is disposed on a post 85 which is connected to a coil member 81. The six movable coil members associated with the six interior strips are disposed for movement on center piece 76 shown in FIG. 4 of the magnetic apparatus 12. Magnetic apparatus 12 as shown in FIG. 2 is secured to a stationary part 42a of the system. While in FIG. 1 strips 1 and 8 are also shown being attached to coil members (no current would be sent through these coils) in a preferred embodiment of the invention only six coils corresponding to strips 1 to 6 would be provided and strips 7 and 8 would merely be secured to a stationary part of the system such as posts secured to the feed plate 42. Referring to FIG. 4 in greater detail it is seen that the magnet assembly includes four permanent magnets 64, 65, 72 and 73 which may be made of any known magnetic material such as for instance Alnico. Each of the magnets has two square corners and one tapered edge, 100 of magnet 72 and 101 of magnet 73. Each of the magnets is arranged to have a north pole facing the middle of the magnetic structure and a south pole facing towards the top or bottom of the magnetic structure. Disposed between magnets 64 and 72 is a piece of high-permeability material 66 which may for instance be soft iron and which has approximately the same shape as the magnets as shown in FIG. 4. A similar piece 67 is disposed between magnets 65 and 73. When the components of the exploded view of FIG. 4 are assembled, pieces 66 and 67 are thus sandwiched between the notrh poles of magnets 64 and 72 and 65 and 73 respectively. Each of the iron pieces 66 and 67 is machined to have a slot 103 and 104 respectively in FIG. 4 to accomodate a third piece of high permeability material. This third piece of high permeability material, is shown at 76 in FIG. 4 and may have attachment tabs 79 and 80 at each end thereof for insertion in slots 103 and 104. Piece 76 is in the shape of a section of a circle and fits into grooves 103 and 104 because of the tapered nature thereof as described above. Pieces 66 and 67 may be arranged to have holes 70 and 71 which may line up with holes 80, as well as similar holes at the right-end tab of piece 76. Suitable fastening pins or bolts may be inserted through the holes to secure piece 76 to pieces 66 and 67. In the alternative, any suitable known method of fastening which does not employ holes may be used. Bottom piece 60 of the magnetic structure is also constructed of a high permeability material such as soft iron and has two recessed portions 62 and 63 the side walls of which 106 and 107 are tapered, to accomodate magnets 64 and 65. Top piece 74 is identical to bottom piece 62.

Exclusive of piece 76 which is fastened to pieces 66 and 67 the magnetic structure shown in FIG. 4 is assembled by merely bringing the magnets and pieces of high permeability material together so that the respective pieces line up with each other. Thus, if all the pieces of the exploded view of FIG. 4 were compressed, the magnetic structure of the invention would be assembled. A housing 75 if disposed over three sides of the structure to insure rigidity and relative non-movement of the parts, While the magnetic structure of FIG. 4 is shown as being comprised of a number of different parts, it is to be understood that a similar magnetic structure of a more unitary construction is within the scope of the invention.

The magnetic lines of force of the structure of FIG. 4 originate at each north pole, travel through high permeability pieces 66 and 67 respectively through high permeability piece 76, through the air gap between piece 76 and top and bottom pieces 60 and 74 and through pieces 62 and 74 back again to the south poles of each of the magnets. Thus, the direction of some of the magnetic lines of force traveling through center piece 76 is illustrated in FIG. 4. The top most set of lines is originated by magnets 72 and 73 and the bottom most set of lines of originated by magnets 64 and 65.

Each of the coil members, such as coil member 81 in FIG. 3 has a central cut-out portion such as 82. Before assembly of the magnetic structure, the cut-out portion of each of the coil members is threaded onto center piece 76. Additionally, a stationary pin 92 and insulators 76 are extended through holes 127 of members 81 and through holes 128 of members 81 and act as a clamp for members 81. Portions 83 and 84 of member 81 are flexible while portions 111, 112 and the remainder of the member is rigid and the magnetic forces are therefore effective to move the members on piece 76 by flexing portions 83 and 84 about the pin extending through holes 127 and 128. In the top view of the magnetic structure shown in FIG. 5, three such coil members 91, 92 and 93 are shown mounted for movement on center piece 76.

Each of the coil members, such as 81, has a vertically extending post 85 disposed at the front end thereof. Post 85 may be constructed of any suitable rigid material and as shown in FIG. 3a has a groove 89 disposed somewhere along its length. Elongated strip 109 in FIG. 3 is formed with a loop at the right hand end thereof of a diameter which allows it to firmly fit around post 85. The loop of strip 109 is formed by bending the right hand end of the strip 360° around and welding or soldering the two portions of the strip to each other at 88. Loop 86 of strip 109 is arranged to have an indentation 87 at a particular point along its length. This indentation is arranged to fit into groove 89 of post 85 in locking arrangement so that strip 109 is securely fastened to post 85. As shown in FIG. 2, post 85 extends through opening 44 in feed plate 42 and the vertical positions of slot 89 and indentation 87 are arranged to bring the elongated strip to the proper vertical position just above or touching feed plate 42. One advantage in securing the strips to coil members such as 81 instead of winding the coils right on the strips is that the documents do not abrade the coils in their passage through the channel entrance.

Figure 8:
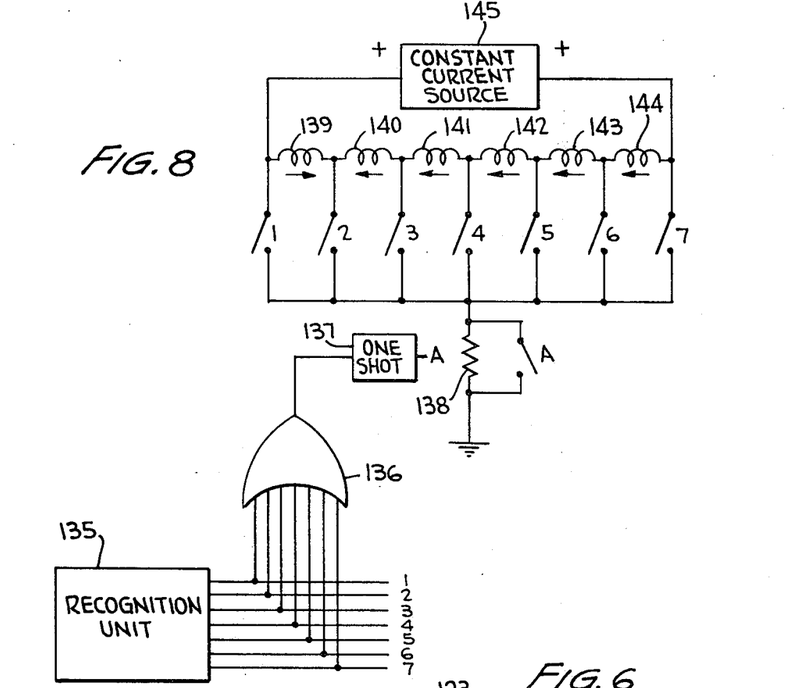
FIG. 8 is a diagram of the electronic system for providing current to the coils of the coils of the coil members, one of which is shown in FIGS. 6 and 7.

Current is supplied to the coils of each of the coil members 81 by the connection of appropriate circuitry to the tabs of leads 83 and 84. The appropriate circuitry which is shown in FIG. 8 is arranged to send current through the coils of coil members 81 in either the clockwise direction as shown in FIG. 3 or in the counter-clockwise direction. When coil member 81 is disposed on center piece 76 of the magnetic structure, upper piece 111 of the coil member will be disposed in the air gap between piece 76 and upper piece 74 and lower piece 112 will be disposed in the air gap between piece 76 and lower piece 60. The magnetic lines of force in the upper air gap traveling from bottom to top interact with the current flowing in portion 111 which may for instance be traveling from left to right and the lines of force in the bottom air gap traveling from top to bottom interact with the current in portion 112 which would be flowing from right to left if the current in portion 111 were flowing from left to right. Hence, the force exerted on both portions 111 and 112 by the interaction of magnetic field and current will be in the same direction. This force will tend to pull the coil members towards the right-side magnets 65 and 73 if the current flows in one direction and towards the left side magnets 64 and 72 if the current flows in the opposite direction. Hence, by selectively controlling the direction of the flow of the current in each of the six movable coil members, any number of coil members may be made to deflect to the right, and any number to the left, thereby selectively opening up any of the seven channels illustrated in FIG. 1 at document selection station 45. It should be appreciated that the magnetic structure shown in FIG. 4 is a relatively closed magnetic structure including low reluctance top and bottom pieces 60 and 74 and low reluctance center piece 76 on which the coils are disposed ensuring that as much of the magnetic field as possible is conserved and concentrated in the area where the magnetic field-current interaction takes place, thereby maximumizing the force applied to the coil members and permitting the magnet pairs to be further from each other than if a more open magnetic circuit were employed. Also, coils with current flowing in opposite direction repel each other increasing speed of separation.

Figures 6, 7:
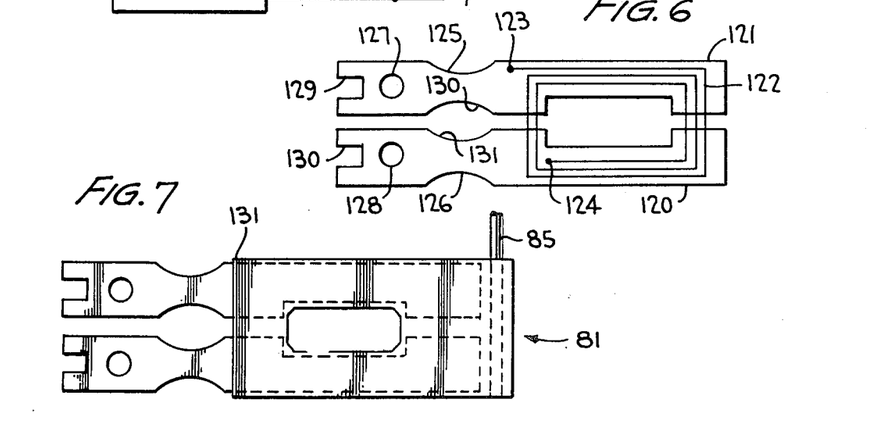
FIG. 6 is a side view with portions broken away of a coil member of the invention showing how the coil member is constructed.
FIG. 7 is a side view of the completely constructed coil member of the invention.

The structure of coil member 81 is shown in greater detail in FIGS. 6 and 7. The coil is wound with insulated copper wire 122 on parallel flexible conducting support members 120 and 121. These members may be constructed of the same beryllium copper material as the elongated strips. The coil is soldered to strip 121 at outside solder point 123 and to strip 120 at inside solder point 124. Conducting wires may then be connected to members 120 and 121 at tabs 129 and 130. Use of the structure shown in FIG. 6 permits the ends of the coil to be connected to external circuitry without bringing the center most part of the coil wire out across the entire coil thereby creating undesirable stress points where the wire being brought out crosses the turns of the coil. As adjacent coil members tend to slap each other with substantial force when forming a new entrance channel at the document selection station the stress points eliminated by the present structure are present potential open circuits.

Each of memberrs 120 and 121 has cut-out arc portions 126, 131 and 125, 130 as shown in FIG. 6. The purpose of these cut-out portions is to cause the flexing action to be evenly distributed. The structure shown in FIG. 6 is potted such as with the use of epoxy and a member 131 as shown in FIG. 7 is disposed over the potting between members 120 and 121 to give the resulting unit strength and rigidity. Member 131 may also be constructed of beryllium-copper material. Post 85 is properly positioned before the unit is potted.

FIG. 8 shows an electronic system for selectively deflecting the coil members to form an entrance channel for the document to be sorted. Character recognition unit 135 is disposed along the document transport path of document 11 in FIG. 1 upstream of channel selection station 45. Recognition unit 135 is effective to recognize information disposed on or in document 11 indicative of which stacker the document is to be sorted into and is effective to output a signal on one of lines 1 to 7 depending on which of the seven stackers the information is indicative of. By way of example unit 135 may be a character recognition unit as known to those skilled in the art responsive to characters disposed on document 11, may be a bar code or color code recognition unit responsive to a bar or color code disposed on document 11, may be a perforation sensing unit responsive to a configuration of perforations punched into document 11 or may be any other form of recognition unit responsive to information disposed on or in document 11.

Constant current source 145 is a standard constant current source such as, for instance, a standard voltage source connected in series with a high resistance. Coils 139 to 144 are the coils of the six interior movable coil members and are connected in series across the constant current source. A signal appearing on one of output lines 1 to 7 of recognition unit 135 is operative to close a corresponding one of the switches 1 to 7 connected between coils 139 to 144 and resistor 138. While, for convenience of illustration, switches 1 through 7 are illustrated as being mechanical switches, in an actual embodiment they would be electronic switches respectively connected to output lines 1 through 7 of recognition unit 135. For instance, switches 1 to 7 could be transistor switches with coils 139 to 144 being connected in the collector circuits thereof and the signal on one of lines 1 to 7 being operative to forward bias the base-emitter junction of the transistor thereby turning it on. In the alternative, any other known form of electronic switch means could be used for switches 1 to 7.

Closure of one of switches 1 to 7 will cause current to flow in all of the coils to the left of the closed switch in one direction and current to flow in all of the coils to the right of the closed switch in the opposite direction. The arrows of FIG. 8 adjacent coils 139 to 144 are drawn for the case in which switch 2 is closed. Hence, by selectively closing one of switches 1 to 7 the coil members associated with coils 138 to 144 are deflected to selectively open one of the seven transport channels to document 11 at channel selection station 45.

Each of the output lines 1 to 7 of recognition unit 135 are connected to the inputs of OR gate 136. The output of OR gate 136 is connected to one-shot multivibrator 137, a signal at the output of multivibrator 137 being operative to close switch A which may be similar in nature too switches 1 to 7. At the instant that current is first applied to coils 139 to 144, it is desirable to have the maximum amount of current flowing therethrough that the coils can handle on a short term basis to result in a maximum force being applied to the coil members. One-shot multivibrator is arranged to generate a signal having a duration of small percentage of the time that it takes the coil members to assume their final deflected position. The output signal of one-shot multivibrator 137 is operative to close switch A for this period of time thereby short-circuiting resistor 138 and insuring that the maximum amount of current flows through coils 139 to 144 at the instant that the initial force deflects the coil members. After the initial deflection, the output of one-shot multivibrator 137 falls and switch A is opened thereby reconnecting resistor 138 between the coils and ground and reducing the current flow through the coils to a value which they can safety handle on a steady state basis. Hence, FIG. 8 shows a simple and effective arrangement for selectively deflecting the coil members.

Figure 9:
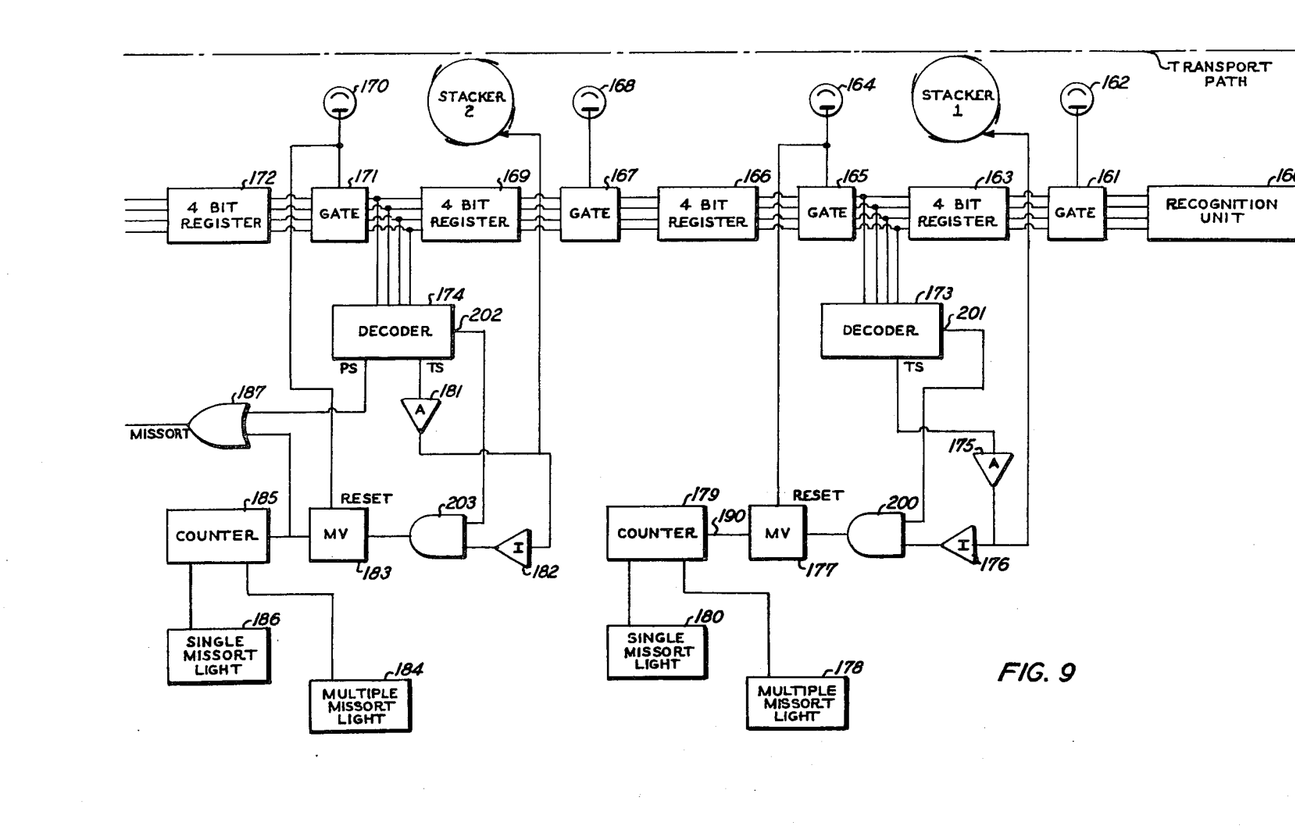
FIG. 9 shows one of the embodiments of the electronics of the sorting system of the invention.
Figure 10:
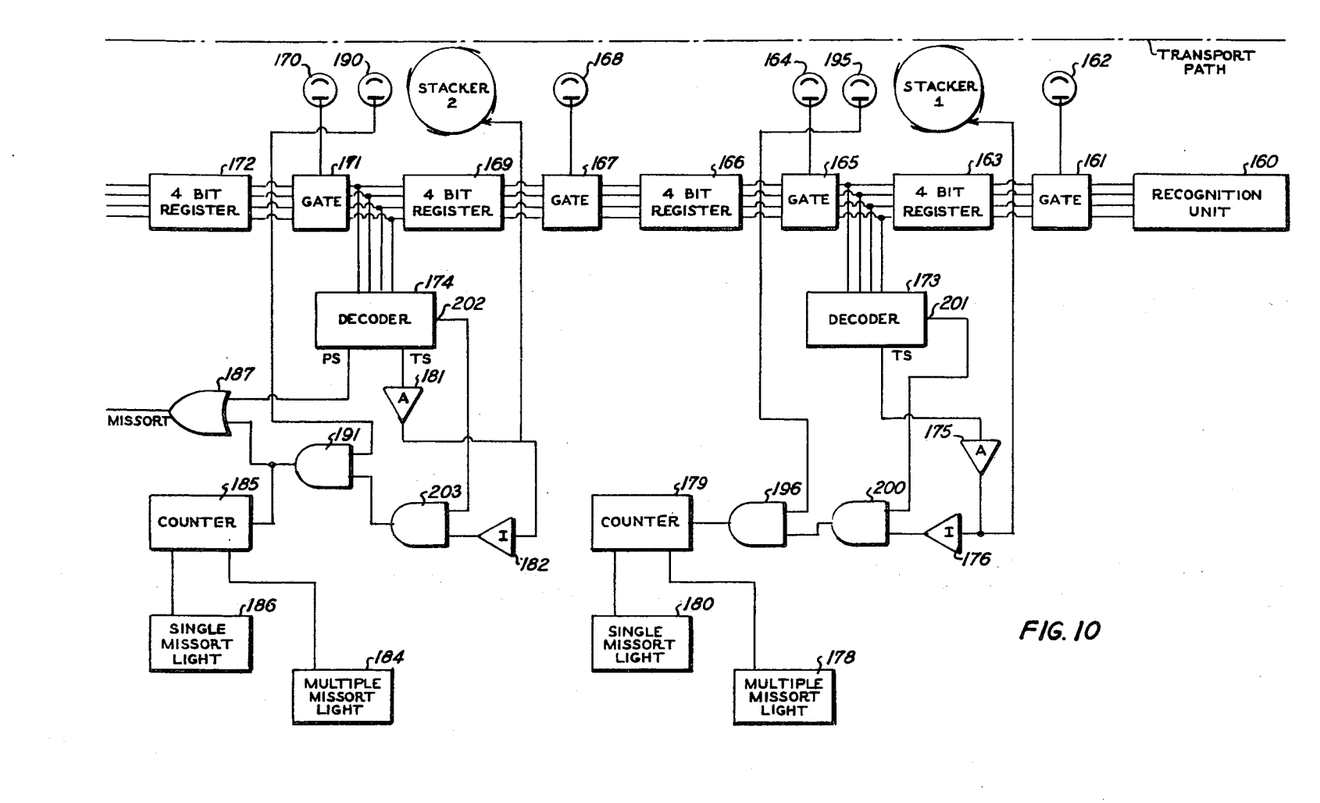
FIG. 10 shows another embodiment of the electronics of the sorting system of the invention.

The electronics for controlling the stackers and for indicating missorts as shown in FIGS. 9 and 10. FIGS. 9 and 10 show the electronics for only two stackers but it is understood that similar electronics could be employed in conjunction with any number of stackers. While the stackers in FIG. 1 are each located at the end of a separate transport channel so that in order for a document to be properly sorted, (1) the document has to be guided into the proper channel and (2) a finger of the stacker must be made to close on the document at the proper time it should be understood that the electronic system shown in FIGS. 9 and 10 may also be employed with stackers which are located along a single channel and that sorting may be accomplished in this manner. Additionally, it is to be understood that it is not necessary to use stackers in conjunction with the electronic system of FIGS. 9 and 10 but that instead any activatable document receiving means such as for instance gates may be used.

Referring to FIG. 9 the document first passes by recognition unit 160 which outputs a 4-bit digital code corresponding to the information recognized on the document. Recognition unit 160 is similar to recognition unit 135 described in conjunction with FIG. 8 except that it includes a 4-bit digital code generator connected to output lines 1 to 7. The system of FIG. 9 employs a plurality of photocells and associated gates and registers displaced at intervals along the transport path. For transferring the code read from the document from register to register, in correspondence with the travel of the document along the transport path. The number of photocells and associated gates and registers which are employed depends on the overall length of the feed and the spacing between successive documents being fed.

Referring to FIG. 9, when the leading edge of a document passes photocell 162, thereby interrupting a beam of light normally incident on photocell 162, such as a beam of light emitted from a light source directly across the transport path from photocell 162, gate 161 is opened and the code indicative of the information read from the document is fed to 4-bit register 163. Decoder 173 is connected to the outputs of register 163 and is operative to emit a signal at output 201 whenever signals appear at the outputs of register 163 and to emit an output signal on output line TS when the outputs of register 163 correspond to the code for stacker 1. The output signal on line TS is amplified by amplifier 175 and is fed to an operating means for stacker 1 such as a relay which is effective to cause a finger of stacker 1 to be present in the transport path and to close on the document when it arrives at the stacker. The details of an operating means for sthe stacker are described in previously mentioned U.S. patent application Ser. No. 256,853. Since the distance between photocell 162 and stacker 1 is known as well as the speed of travel of the document, the time of arrival of the document at stacker 1 is known.

The output of amplifier 175 is also inverted in inverter 176, the output of which is fed to AND gate 200 along with the output 201. The output of AND gate 200 therefore goes high when a code signal not corresponding to the code of stacker 1 is generated at 163 and the output of AND gate 200 is fed to multivibrator 177. Multivibrator 177 is arranged to generate an output signal on line 190, a predetermined period of time after an input signal thereto is received. However, if a signal appears at the reset input of multivibrator 177 before the predetermined time has elapsed, no output signal is generated on line 190. The predetermined delay of multivibrator 177 is arranged to be slightly greater than the time it should take for the document to travel from photocell 162 to photocell 164. When the leading edge of the document intercepts photocell 164, a signal is generated at the reset input of multivibrator 177. Hence, if the document arrives at photocell 164 approximately at the time that it should arrive, no output signal is generated on line 190 while, on the other hand, if the document is missorted into stacker 1 an output signal will be generated on line 190. Line 190 is connected to counter 179 which has a single missort light 180 connected to the first count output thereof and a multiple missort light 178 connected to the second count output thereof. Thus, if one signal is generated on line 190, counter 179 will cause single missort light 180 to become illuminated, while if multiple missorts occur, a second and subsequent signals will be generated on line 190 which will cause counter 179 to illuminate multiple missort light 178.

The signal generated by photocell 164 besides resetting multivibrator 177 is operative to open gate 165 thereby transferring the code signal corresponding to the document to register 166. The leading edge of the document next intercepts photocell 168, the output signal of which opens gate 167 and causes the code signal to be transferred to register 169. The output of register 169 are connected to decoder 174 which has three outputs. As in the case of decoder 173, a signal appears at output 202 whenever signals appear at thhe outputs of register 169 and a signal appears at the TS output of decoder 174 if the code signal corresponds to the code for stacker 2. The signal at the TS output is amplified by amplifier 81, the output signal of which is fed to the operating means for stacker 2 causing a finger of stacker 2 to be present in the transport path and to close on the document when it arrives at the stacker. The output of the amplifier is also fed to inverter 182, the output of which is fed to AND gate 203 along with the signal from decoder output 202. The output of AND gate 203 is fed to multivibrator 183 which is similar to multivibrator 177. The output of photocell 170 is fed to the reset input of multivibrator 183. Multivibrator 183 will generate an output signal if a document not destined for stacker number 2 is sorted into stacker 2 and the output of multivibrator 183 is fed to counter 185, the outputs of which in turn are fed to single missort light 186 and multiple missort light 184.

A signal appears at the third output PS of decoder 174 when the code signal for the previous stacker, which in this case is stacker 1 appears at the outputs of register 169. Since a document corresponding to this code signal should have been sorted into stacker 1, a signal at output PS indicates that a document which should have been sorted into the previous stacker was not in fact so sorted. The output of multivibrator 183 and the PS output of decoder 174 are connected to the inputs of OR gate 187, which emits an output signal when either of the two types of errors has occurred.

There are two possible types of missort erroors which can be made with regard to a document which is entering the area of a stacker. Either the document is not supposed to be sorted into the stacker and it mistakenly is sorted into the stacker, or it is supposed to be sorted into the stacker and it is not so sorted. Referring to the electronics associated with stacker 2 in FIG. 9 the first possible error is detected by an output signal being generated by multivibrator 183 and the second possible error is detected by an output signal occuring at output PS of decoder 202 Hence, the system shown in FIG. 9 is operative to detect and indicate sorting errors shortly after they occur.

The document feeding system may be arranged to stop feeding new documents when an error or missort is indicated. The operator will manually remove the missorted document and processing may continue. The registers used in the system are not resettable so that they retain the code signals until new information is inputted thereto. In the event of an error or jam therefore the registers retain their information content and after the malfunction is corrected processing on the documents in the system can continue.

While because in the system shown in FIG. 9 it is the leading edge of the document itself which transfers the code signal from register to register, the system is relatively time independent compared to prior art systems which transfer the code signal on a time basis. The system shown in FIG. 9, however, is time dependent to the extent that multivibrator 177 sets a predetermined delay time within which the document has to traverse the distance between photocells 162 and 164 before the system signals that a missort has occurred. The system shown in FIG. 10 eliminates this time dependency. Since the system of FIG. 10 has many components in common with the system of FIG. 9, the common components retain the same numbering and the operation thereof is not described. The difference between the systems of FIGS. 9 and 10 is the addition of photocells 195 annd 190 and AND gates 191 and 196 and the elimination of multivibrators 177 and 183. Photocells 195 and 190 are arranged adjacent to stackers 1 and 2 respectively so that they will cause a signal to be emitted when a document is sorted into the stacker. Referring to stacker 1 the output of photocell 195 is connected to AND gate 196 the other input of which is connected to the output of AND gate 200. The output of AND gate 200 goes high when signals not corresponding to the code of stacker 1 are outputted at register 163. A high output at AND gate 200 indicates that a document was sorted into stacker 1 even though its code did not correspond to the code of stacker 1. The output of photocell 190 associated with stacker 2 is fed to AND gate 191 which operates in a similar fashion. Additonally, the output of AND gate 191 is fed to OR gate 187, the output of which indicates that an error has occurred.

While we have disclosed and described the preferred embodiments of our invention, we wish it understood that we do not intend to be restricted solely thereto, but that we do intend to include all embodiments thereof which would be apparent to one skilled in the art and which come within the spirit and scope of our invention.

We claim:
1. A document sorting system for sorting documents conveyed along a transport path into selected ones of a plurality of activatable document receiving means located along said transport path, each of said document receiving means having a predetermined code associated therewith and having to be conditioned by an activation signal to properly receive said documents, comprising, means responsive to information disposed on or in a document for generating a code signal indicative of the receiving means into which said document is to be sorted, a plurality of transducer means located along said transport path, each transducer means being effective to cause a leading edge signal to be generated when the leading edge of a document passes said trans- ducer means, a code signal storage means associated with each transducer means and responsive to said leading edge signal for storing the code signal associated with the document causing the signal to be generated, a decoder means associated with each document receiving means and responsive to the code signal outputs of the code signal storage means associated with the transducer means preceding the document receiving means with which the decoder means is associated for generating an activation signal for said document receiving means when said code signal outputs correspond to the code associated with said document receiving means, means associated with each decoder means for generating a conditiion signal when code signals are inputted to the decoder means but when the decoder means does not generate said activation signal, and means responsive to said condition signal for generating a missort indication if the leading edge of a document does not interrupt the transducer means following the receiving means with which said decoder means is associated within a predetermined time said means for generating a missort indication including a delay means, said delay means including a resettable multi-vibrator means triggered by said conditon signal for generating a signal causing said missort indication if said multi-vibrator means is not reset within said predetermined time from the occurrence of said condition signal, a signal caused to be generated by said following transducer means being effective to reset said multi-vibrator means.

2. The system of claim 1 wherein said means for generating a missort indication includes means for generating single and multiple missort indications.

3. The system of claim 1 wherein said transducer means comprise light responsive means.

4. The system of claim 3 wherein said document receiving means comprise stacker means.

* * * * *